United States Patent
Zhou et al.

(10) Patent No.: US 9,770,726 B2
(45) Date of Patent: Sep. 26, 2017

(54) HIGH TEMPERATURE PROTECTIVE VALVE AND THE USE THEREOF IN A SHOWER HEAD

(75) Inventors: Huasong Zhou, Xiamen (CN); Zhongcheng Jin, Xiamen (CN); Hui Huang, Xiamen (CN); Bin Cao, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 660 days.

(21) Appl. No.: 14/116,202

(22) PCT Filed: May 8, 2012

(86) PCT No.: PCT/CN2012/075177
§ 371 (c)(1),
(2), (4) Date: Nov. 7, 2013

(87) PCT Pub. No.: WO2012/152213
PCT Pub. Date: Nov. 15, 2012

(65) Prior Publication Data
US 2014/0076993 A1    Mar. 20, 2014

(30) Foreign Application Priority Data
May 10, 2011   (CN) .......................... 2011 1 0120276

(51) Int. Cl.
*F16K 17/38*   (2006.01)
*F16K 31/00*   (2006.01)
(Continued)

(52) U.S. Cl.
CPC ............ *B05B 1/3013* (2013.01); *B05B 12/10* (2013.01); *F16K 31/002* (2013.01); *B05B 1/18* (2013.01); *Y10T 137/7737* (2015.04)

(58) Field of Classification Search
CPC ..... B05B 1/3013; F16K 31/002; F16K 17/38; Y10T 137/7737; E03C 1/041; E03C 1/044; G05D 23/025
See application file for complete search history.

(56) References Cited

U.S. PATENT DOCUMENTS 2,318,157 A * 5/1943 Heiser ................... F25B 41/043
137/510
4,180,208 A * 12/1979 Obermaier ........... G05D 23/022
236/100
(Continued)

FOREIGN PATENT DOCUMENTS

CN            2692430 Y     4/2005
CN            1860319 A     11/2006
(Continued)

*Primary Examiner* — Larry Furdge
(74) *Attorney, Agent, or Firm* — Rabin & Berdo, P.C.

(57) ABSTRACT

A high temperature protective valve and the use thereof in a shower head, wherein the high temperature protective valve includes a body, the body having a complete one-way waterway, and also a thermo-sensitive assembly and a pivot valve assembly. The thermo-sensitive assembly is fixed inside the body and has a memory alloy body which can be immersed in the waterway and extend and retract along the direction of the flow. The pivot valve assembly is also fixed inside the body downstream waterway of the thermo-sensitive assembly. The pivot valve assembly has a pivot valve plug which is controllable by the thermo-sensitive assembly so as to cut off the waterway. The high temperature protective valve of such a structure has a fast response and can achieve good protective effects at a high temperature.

9 Claims, 5 Drawing Sheets

(51) Int. Cl.
*G05D 23/02* (2006.01)
*B05B 1/30* (2006.01)
*B05B 12/10* (2006.01)
*B05B 1/18* (2006.01)

(56) References Cited

U.S. PATENT DOCUMENTS

| | | | | |
|---|---|---|---|---|
| 7,320,334 | B1* | 1/2008 | Trimble | F15B 11/0445 |
| | | | | 137/493.1 |
| 2007/0075152 | A1* | 4/2007 | Guterman | E03C 1/041 |
| | | | | 236/93 R |
| 2007/0194136 | A1* | 8/2007 | Cunningham | F16K 31/002 |
| | | | | 236/12.11 |
| 2007/0194141 | A1* | 8/2007 | Brown | E03C 1/0408 |
| | | | | 236/93 A |

FOREIGN PATENT DOCUMENTS

| | | |
|---|---|---|
| CN | 101178128 A | 5/2008 |
| CN | 202176810 U | 3/2012 |
| JP | 2003120852 A | 4/2003 |
| JP | 2006046527 A | 2/2006 |
| JP | 2008241024 A | 10/2008 |

* cited by examiner

HIGH TEMPERATURE PROTECTIVE VALVE AND THE USE THEREOF IN A SHOWER HEAD

FIELD OF THE INVENTION

The present invention relates to an accessory of sanitary ware, especially to a high temperature protective valve and the use thereof in a shower head.

BACKGROUND OF THE INVENTION

It may happen that the water temperature is high when showering, when the temperature is higher than the proper value of 45° C., people feel uncomfortable, hurt, even get scaled. It happens when cold water is not serviced well, when the pipe gets wrong or when cold water and hot water are not mixed well, these situations are unpredictable. How to cut off the water with high temperature sensitively in a short time is a necessary humanization demands; meanwhile, if the device is smart enough to integrate into kinds of small sanitary wares, it makes it a convenient one to benefit the manufacturing and the users.

SUMMARY OF THE INVENTION

The present invention is provided with a high temperature protective valve to solve the technical problems of the existing technology, the technical proposal is as below:

A high temperature protective valve, comprising a body, the body is disposed with a complete one-way waterway, wherein further comprising:

a thermo-sensitive assembly (110), which is fixed inside the body, the thermo-sensitive assembly has a memory alloy body (112) which can be immersed in the waterway and extend and retract along the direction of the flow; and a pivot valve assembly (120), which is fixed inside the body and has a pivot valve plug (124) controllable by the thermo-sensitive assembly (110) so as to cut off the waterway.

In another preferred embodiment, the memory alloy body (112) is a spring shape, the fixing end is situated in the most upstream waterway.

In another preferred embodiment, the pivot valve assembly (120) is disposed with a plug (122) fixed to the memory alloy body (112) and a pivot hole (124b) on-off controllable by the plug (122).

In another preferred embodiment, the pivot vale plug (124) comprising a packing leather (124a) to control the on-off of the downstream waterway.

In another preferred embodiment, the pivot valve plug (124) comprising a pivot cavity (124c) and a backpressure cavity (124d), the pivot cavity (124c) and the backpressure cavity (124d) are disposed in order from upstream waterway to downstream waterway, and are connected by a guiding pipe (124e); the plug (122) and the pivot hole (124b) are situated inside the pivot cavity (124c); the pivot hole (124b) is connected to a pressure relief hole (124h) to connect to the downstream waterway of the backpressure cavity (124d); the packing leather (124a) is situated in the end face of the downstream waterway of the backpressure cavity (124d); the backpressure cavity (124d) further comprising a needle valve (124f).

In another preferred embodiment, the movable end of the memory alloy body (112) is fixed with a pushing rod (113), the pushing rod (113) threads a positioning sleeve (131) movably, and is fixed to the plug (122), the pushing rod (113) is disposed with a piston (113a), which can slide along the axial direction inside the positioning sleeve (131).

In another preferred embodiment, the backpressure cavity (124d) is disposed with a restoring spring (124g) to hold the shape of the packing leather (124a).

The technical proposal of the use of the high temperature protective valve in a shower head is as below:

A shower head with a high temperature valve, comprising a body, the body has a complete one-way waterway, wherein further comprising:

a thermo-sensitive assembly (110), which is fixed inside the body, the thermo-sensitive assembly has a memory alloy body (112) which can be immersed in the waterway and extend and retract along the direction of the flow; and a pivot valve assembly (120), which is fixed inside the body (110) in the downstream waterway of the thermo-sensitive assembly (110);

thereinto, the pivot valve assembly (120) has a pivot valve plug (124) controllable by the thermo-sensitive assembly (110) so as to cut off the waterway; the downstream waterway of the pivot valve plug (124) is disposed with a straight switch (130), which can manually release the waterway from disconnecting state by the pivot valve plug (124).

the straight switch (130) comprising a moving pipe (132), a button (131) and a second spring (133); the moving pipe (132) is coupled to the inside of the body in the axial direction in moving way, one end of the moving pipe (132) is disposed with an entrance coupled to the packing leather (124a), the other end of the moving pipe (132) is connected to the body by the second spring (133); the button (131) is disposed with a guiding inclined surface to make the moving pipe (132) detached from the packing leather (124a) in the axial direction.

The advantages of the present invention are that:

1. the thermo-sensitive assembly is immersed inside the waterway, when the memory alloy body extends to the downstream waterway in a preset water temperature, it is coupled to the controlled pivot valve to cut off the waterway for high temperature protect.
2. the pivot valve plug with a pivot hole, a backpressure cavity, a needle valve and a packing leather can plug the waterway effectively when the plug cuts off the pivot hole.
3. the pushing rod with a piston can improve the sensitivity of the plug to touch the pivot hole.
4. in a shower head with a high temperature protective valve, the moving pipe is controlled by the button, the detachable structure with the packing leather makes it available to manually release the high temperature protective state, satisfying different needs, so that it is with flexible application.

BRIEF DESCRIPTION OF THE DRAWINGS

The present invention will be further described with the drawings and the embodiments.

DETAILED DESCRIPTION OF THE EMBODIMENTS

The First Embodiment

Figure 1:
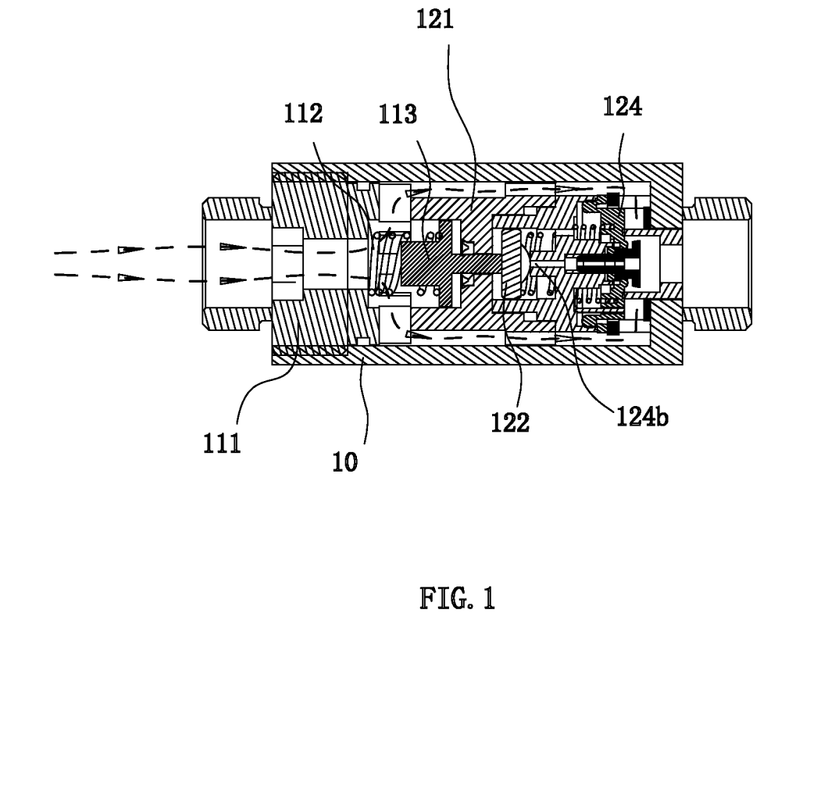
FIG. 1 illustrates the sectional view of the first embodiment of the present invention.

A high temperature protective valve of the present invention is figured in FIG. 1, the valve is an one-way straight pipe, the valve is disposed with a body 10 with two connecting heads, a thermo-sensitive assembly and a pivot valve assembly, the thermo-sensitive assembly and the pivot valve assembly are disposed inside the body 10 in the axial direction in order; the thermo-sensitive assembly comprising a memory alloy body 112 and a pushing rod 113 and a joint 111 in the end thereof; a pivot valve assembly is disposed downstream waterway of the thermo-sensitive assembly, the pivot valve assembly comprising a pivot valve plug 124, a positioning sleeve 121 and a plug 122. in this embodiment, the memory alloy body 112 is a spring shape, the fixing end of the spring is disposed in the upstream waterway.

Figure 3:
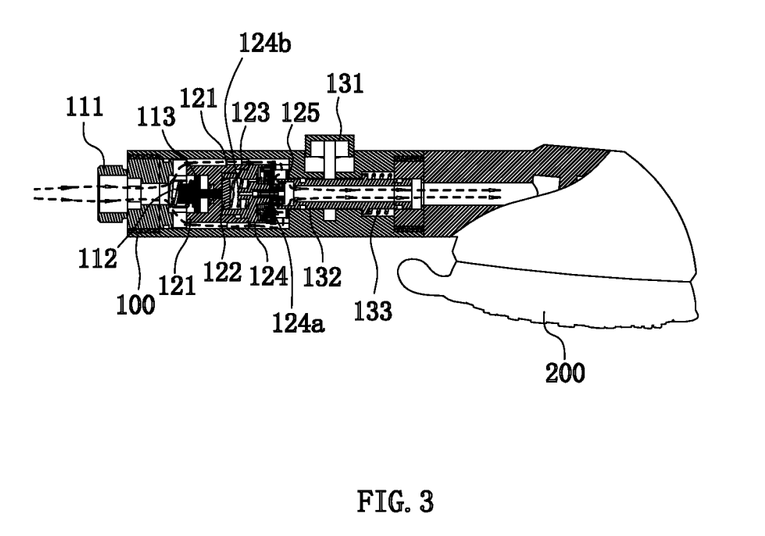
FIG. 3 illustrates the sectional view of the second embodiment in FIG. 2.
Figure 4:
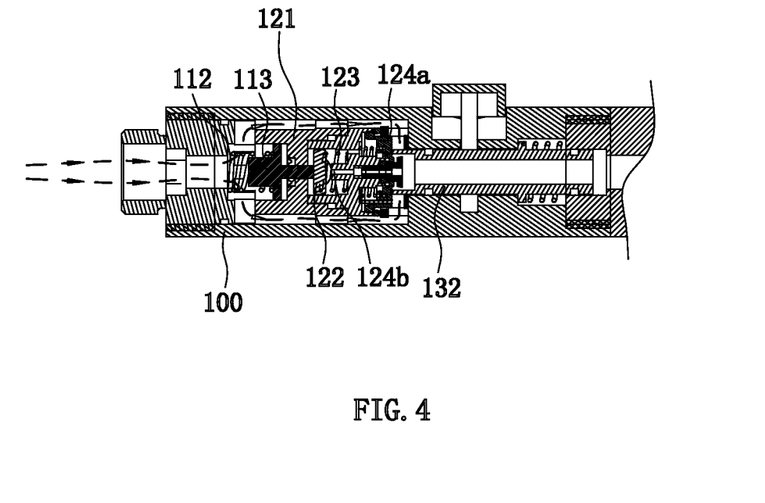
FIG. 4 illustrates the sectional view of the second embodiment in FIG. 2 in protective state.
Figure 5:
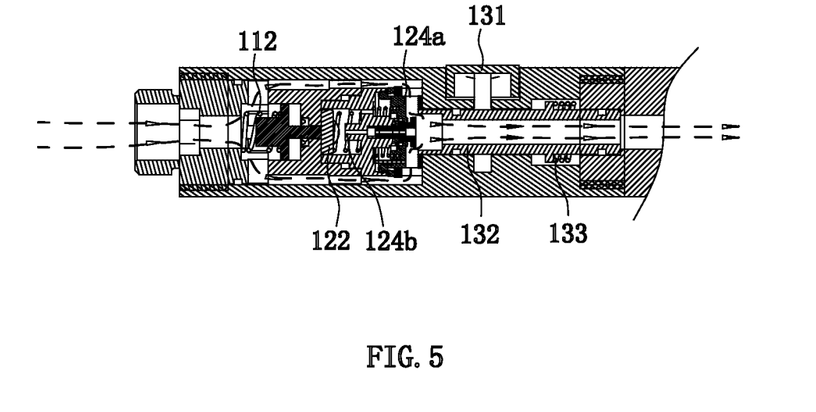
FIG. 5 illustrates the sectional view of the second embodiment in FIG. 2 in connecting state.

As figured in the arrow in FIG. 1, hot water flows in from the joint 111, then the memory alloy body 112 is immersed in the waterway, when the water temperature is higher than the recovery temperature of the memory alloy body 112, the memory alloy body 112 extends along the downstream direction so as to push the pushing rod 112; the pushing rod 112 slides along the downstream direction inside the positioning sleeve 121, the plug 122 at top end of the pushing rod 112 plugs the opening 124b of the pivot valve assembly, so that the pivot valve assembly 124 cuts off the waterway (as figured in FIG. 3, FIG. 4 and FIG. 5). This embodiment of valve has small size, it is available in many kinds of pipes, and can be used in many outlet devices of temperature controlled.

The Second Embodiment

Figure 2:
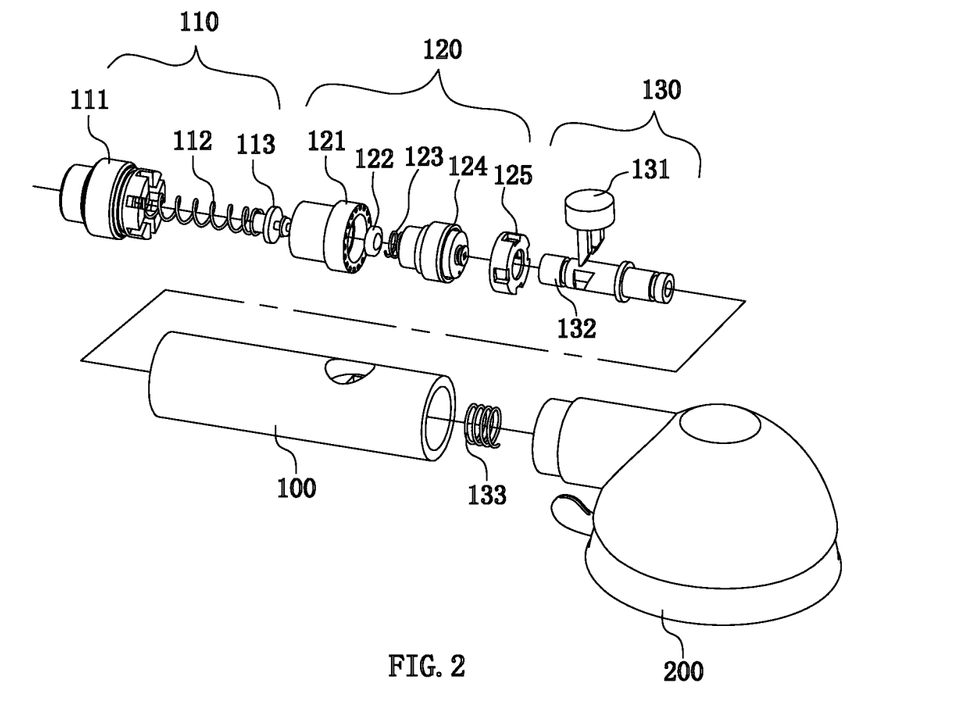
FIG. 2 illustrates the breakdown structure of the second embodiment of the present invention with each main component.

The present invention is also provided with a shower head with a high temperature protective valve, as figured in FIG. 2; the handle 100 and the shower head 200 compose the main components of the whole device housing, the handle 100 and the shower head 200 are hollow, and have a connecting and complete waterway.

The thermo-sensitive assembly 110, the pivot valve assembly 120 and the straight switch 130 are disposed inside the handle 100, from the end of the handle 100 to the shower head 200 there are:

The thermo-sensitive assembly 110 comprising a joint 11, a memory alloy body 112 and the pushing rod 113; the joint 111 is fixed in the end of the handle 100, it constitutes a part of the housing, and it is fixed to one end of the memory alloy body 112. the other end of the memory alloy body 112 is movable in the axial direction, and is fixed with the pushing rod 113.

The pivot valve assembly 120 comprising a positioning sleeve 121, a plug 122, a first compression spring 123 and a pivot valve plug 125; thereinto, the plug 122 is fixed to the pushing rod 113 extended out of the positioning sleeve 121, so that the pushing rod 113 can drive the plug 122 to move a certain distance in the axial direction between the positioning sleeve 121 and the pivot valve plug 124; the first compression spring 123 is fixed between the plug 122 and the pivot valve plug 124, and provides with a reverse stress with respect to the memory alloy body 112 by the plug 122. in normal station, the first compression spring 123 pushes the plug 122 so that the plug 122 is away from the pivot valve plug 124. The pivot valve plug is connected to downstream waterway by a spacer 125. The positioning sleeve 121, the pivot valve plug 124 and the spacer 125 are fixed to the handle 100 relatively.

The straight switch 130 comprising a button 131, a movable pipe 132 and two compression spring 133; thereinto, the movable pipe 132 is connected to the shower head 200 by the second compression spring 133, the button 131 is inserted from the hole in the outside of the body 100 and fixed so as to cooperate with the movable pipe 132; from the drawings, the button 131 controls the movable pipe 132 to move in the axial direction by a guiding inclined surface with its own movement up and down, so that the movable pipe 132 is near to or away from the pivot valve plug 124 in the axial direction. the straight switch is a switch that the on and off are respectively corresponding to the connecting state and cut off state of the whole device; when in connecting state, it releases the high temperature protective function, otherwise the protective function is effective.

In this embodiment, the recovery temperature of the memory alloy body 112 is 45° C., with the spring shape, when the temperature is lower than 45° C., the memory alloy body 112 keeps compressed in the axial direction. when water flows from the joint 111 into the body 100, it runs through the memory alloy body 112, then flows through the clearance between the positioning sleeve 121 and the internal wall of the body 100, the clearance between the pivot valve plug 124 and the internal wall of the body 100 and the space inside the spacer 125.

FIG. 3 is the sectional view of FIG. 2 in normal working station and the waterway, the dot line arrow is the water flowing direction in the drawing. Water resource enters from the joint 111, then runs through the clearance between the whole of the positioning sleeve 121 and the pivot valve plug 124 and the internal wall of the handle 100, then reaches to the cavity of the spacer. In this position, the packing leather 124a of the pivot valve plug 124 is not contacted to the end of the moving pipe 132, there is clearance between both, so that water can flows from the spacer 125 to the moving pipe 132, then flows out of the shower head 200 under normal service. In this working state, the water temperature is not higher than 45° C., so that the memory alloy body 112 is contracted, the axial length is shorter, with the pressure of the first spring 124, the plug 122 is not contacted to the pivot hole 124b of the pivot valve plug 124 but is withstood the internal wall of the positioning sleeve 121 in the upstream waterway.

FIG. 4 is the sectional view of the embodiment in FIG. 2 in protective state. It illustrates the high temperature protective function. As the memory alloy body 112 is always immersed in the water, it real-time monitors the water. When the water temperature is higher than the preset temperature of 45° C., the memory alloy body 112 extends along the downstream waterway, the force is larger than that of the first spring 123, the pushing rod 113 drives the plug 122 to get close to the pivot hole 124b and finally plug the pivot hole 124b. As he internal pressure of the packing leather 124a is larger than the external pressure, the packing leather 124a expands to contact the end of the moving pipe 132, so that water is kept in the external of the packing leather 124a and is unable to flow into the moving pipe 132, the moving pipe 132 is cut off, achieving the object of high temperature protecting. Through parameter design of memory alloy body 112 and the first spring 123, it can achieve different memory alloy body 112 effectively extending in different temperature to satisfy different water temperature protecting needs.

FIG. 5 is the sectional view of the embodiment in FIG. 2 in straight connecting state. In this working state, the button 131 is pressed down, the moving pipe 132 slides along the downstream waterway, so that the clearance between the packing leather 124*a* and the end of the moving pipe 132 is increase, whatever the state of the memory alloy body 112 is or whether the plug 112 plugs the pivot hole 124*b* or not, the water can flow into the moving pipe 132. it releases the protective function of the device by pressing the button 131 down. From another view angle, if the button 131 is not pressed down manually, the device is always in auto-protective state.

Figure 6:
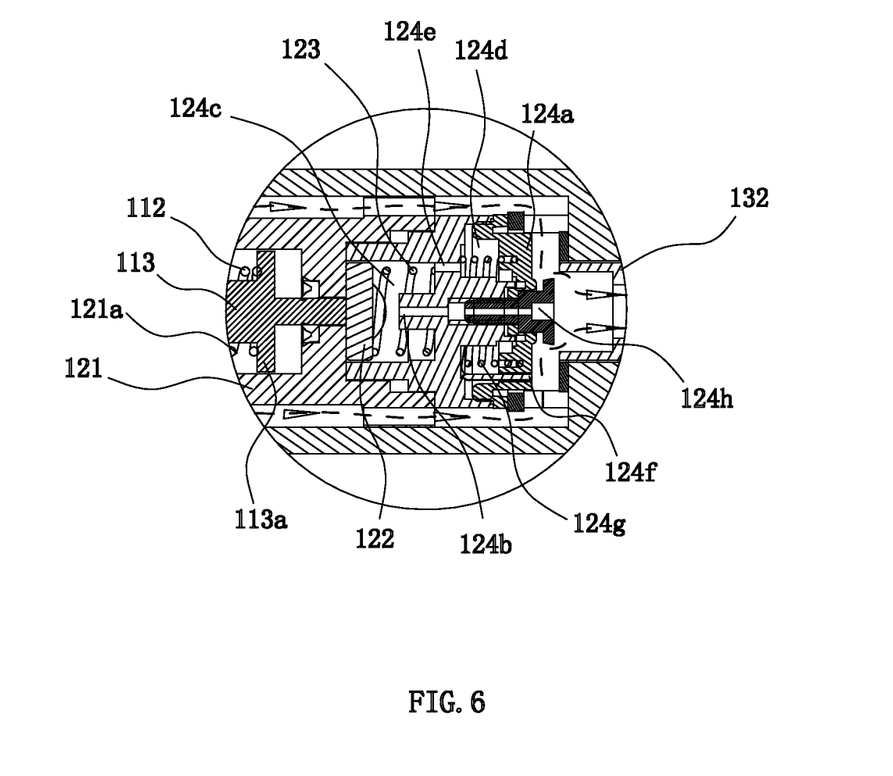
FIG. 6 illustrates the sectional view of the pivot valve assembly of the second embodiment in FIG. 2.

FIG. 6 is the sectional view of the pivot valve assembly of the embodiment of FIG. 2. a rod cavity 121*a* is disposed in the upstream end of the positioning sleeve 121 to accommodate the pushing rod 113; the central of the pushing rod is disposed with a piston 113, the memory alloy body 112 is sleeved on the pushing rod 112 and is contacted the piston 113*a* in the axial direction. As the water pressures in the two sides of the piston 113*a* are different, it generates a pressure towards the upstream waterway to make a damping action when the pushing rod 113 drives the plug 112 to extend towards the downstream waterway.

The pivot valve plug is divided into two cavities in the axial direction: the pivot cavity 124*c* and the backpressure cavity 124*d*. two cavities are connected by a guiding pipe 124*e*; the packing leather 124*a* is in one side of the downstream waterway of the backpressure cavity 124*d*, the packing leather 124*a* has a needle valve 124*f* to connect to the backpressure cavity 124*d*; a pressure relief hole 124*h* is disposed in the central of the packing leather 124*a*, the pivot hole 124*b* is connected to the side surface of the downstream waterway of the packing leather 124*a* by the pressure relief hole 124*h*.

When in use, when the memory alloy body 112 extends, the pushing rod 113 drives the plug 122 to plug the pivot hole 124*b*, water flows into the backpressure cavity 124*c* through the needle valve 124 in one way, as the effective area of the internal side of the packing leather 124*a* is larger than that of the external side, the downstream waterway side, the packing leather 124*a* expands towards the external side to contact the unmoving moving pipe 132 to cut off the moving pipe 132, achieving protecting object. If water temperature is not high enough or it recovers below the protective temperature, the plug 122 moves towards the upstream waterway under the work of the first spring 123 and the piston 113*a*, the pivot hole 124*b* is released, as the pivot hole 124*b* is connected to the pressure relief hole 124*h*, the water pressure inside the backpressure cavity 124*d* is not strong enough to make the packing leather expanded, that is the normal working state. The restoring spring 124*g* is used to assist to maintain the normal shape of the packing leather 124*a*.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a high temperature protective valve and the use thereof in a shower, the thermo-sensitive assembly is immersed inside the waterway, when the memory alloy body extends to the downstream waterway in a preset water temperature, it is coupled to the controlled pivot valve to cut off the waterway for well high temperature protecting.

The invention claimed is:

1. A high temperature protective valve, comprising a body, the body is disposed with a complete one-way waterway, wherein further comprising:
   a thermo-sensitive assembly (110), which is fixed inside the body, the thermo-sensitive assembly has a memory alloy body (112) which can be immersed in the waterway and extend and retract along the direction of the flow; and
   a pivot valve assembly (120), which is fixed inside the body (110) and has a pivot valve plug (124) controllable by the thermo-sensitive assembly (110) so as to cut off a downstream waterway of a backpressure cavity (124*d*),
   wherein the pivot valve assembly (120) is provided with a plug (122) fixed to the memory alloy body (112),
   the pivot valve plug (124) is provided with a pivot hole (124*b*) centrally located therein and on-off controllable by the plug (122), the plug (122) and the pivot hole (124*b*) situated inside a pivot cavity (124*c*);
   the pivot cavity (124*c*) and the backpressure cavity (124*d*) are disposed in order from an upstream waterway to the downstream waterway, and connected by a guiding pipe (124*e*), the backpressure cavity (124*d*) further comprising a needle valve (124*f*);
   the pivot hole (124*b*) is connected to a pressure relief hole (124*h*) to connect to the downstream waterway of the backpressure cavity (124*d*); and
   the pivot valve plug (124) further comprises a packing leather (124*a*) to control the on-off of the downstream waterway of the backpressure cavity (124*d*) in response to changes in water pressure between upstream and downstream waterways due to opening and closing of the pivot hole (124*b*) by the plug (122), the packing leather (124*a*) being situated in the end face of the downstream waterway of the backpressure cavity (124*d*).

2. A high temperature protective valve according to claim 1, wherein the memory alloy body (112) is a spring shape, the fixing end is situated in the most upstream waterway.

3. A high temperature protective valve according to claim 1, wherein the movable end of the memory alloy body (112) is fixed with a pushing rod (113), the pushing rod (113) threads a positioning sleeve (131) movably, and is fixed to the plug (122), the pushing rod (113) is disposed with a piston (113*a*), which can slide along the axial direction inside the positioning sleeve (131).

4. A high temperature protective valve according to claim 1, wherein the backpressure cavity (124*d*) is disposed with a restoring spring (124*g*) to hold the shape of the packing leather (124*a*).

5. A shower head with a high temperature protective valve, comprising a body, the body has a complete one-way waterway, wherein further comprising:
   a thermo-sensitive assembly (110), which is fixed inside the body, the thermo-sensitive assembly has a memory alloy body (112) which can be immersed in the waterway and extend and retract along the direction of the flow; and
   a pivot valve assembly (120), which is fixed inside the body (110) in the downstream waterway of the thermo-sensitive assembly (110);

wherein, the pivot valve assembly (120) has a pivot valve plug (124) controllable by the thermo-sensitive assembly (110) so as to cut off the waterway;
a downstream waterway of the pivot valve plug (124) is disposed with a straight switch (130), which can manually release the waterway from disconnecting state by the pivot valve plug (124), wherein
  the pivot valve assembly (120) is provided with a plug (122) fixed to the memory alloy body (112),
  the pivot valve plug (124) is provided with a pivot hole (124b) centrally located therein and on-off controllable by the plug (122), the plug (122) and the pivot hole (124b) situated inside a pivot cavity (124c);
  the pivot valve plug (124) comprising the pivot cavity (124c) and a backpressure cavity (124d), the pivot cavity (124c) and the backpressure cavity (124d) disposed in order from upstream waterway to downstream waterway, and connected by a guiding pipe (124e), the backpressure cavity (124d) further comprising a needle valve (124f);
  the pivot hole (124b) is connected to a pressure relief hole (124h) to connect to the downstream waterway of the backpressure cavity (124d); and
  the pivot valve plug (124) further comprises a packing leather (124a) to control the on-off of the downstream waterway of the backpressure cavity (124d) in response to changes in water pressure between upstream and downstream waterways due to opening and closing of the pivot hole (124b) by the plug (122), the packing leather (124a) being situated in the end face of the downstream waterway of the backpressure cavity (124d).

6. A shower head with a high temperature protective valve according to claim 5, wherein
  the straight switch (130) comprising a moving pipe (132), a button (131) and a second spring (133);
  the moving pipe (132) is coupled to the inside of the body in the axial direction in moving way, one end of the moving pipe (132) is disposed with an entrance coupled to the packing leather (124a), the other end of the moving pipe (132) is connected to the body by the second spring (133);
  the button (131) is disposed with a guiding inclined surface to make the moving pipe (132) detached from the packing leather (124a) in the axial direction.

7. A shower head with a high temperature protective valve according to claim 5, wherein the memory alloy body (112) is a spring shape, the fixing end of the spring is situated in the most upstream waterway.

8. A shower head with a high temperature protective valve according to claim 7, wherein the movable end of the memory alloy body (112) is fixed with a pushing rod (113), the pushing rod (113) threads a positioning sleeve (131) movably, and is fixed to the plug (122), the pushing rod (113) is disposed with a piston (113a), which can slide along the axial direction inside the positioning sleeve (131).

9. A shower head with a high temperature protective valve according to claim 7, wherein the backpressure cavity (124d) is disposed with a restoring spring (124g) to hold the shape of the packing leather (124a).

\* \* \* \* \*